United States Patent
Concin et al.

(10) Patent No.: US 12,248,307 B2
(45) Date of Patent: Mar. 11, 2025

(54) METHOD FOR MONITORING THE PRODUCTION OF CONTAINERS FILLED WITH AN AQUEOUS SYSTEM WITH A PRODUCTION FACILITY, USE OF A MONITORING METHOD AND PRODUCTION FACILITY

(71) Applicant: Red Bull GmbH, Fuschl am See (AT)

(72) Inventors: Roland Concin, Fuschl am See (AT);
Ralf Öchsner, Fuschl am See (AT);
Christian Pillei, Fuschl am See (AT);
Arno Breuss, Fuschl am See (AT);
Bernhard Lang, Fuschl am See (AT);
Patrick Vonbruel, Fuschl am See (AT)

(73) Assignee: Red Bull GmbH, Fuschl am See (AT)

( * ) Notice: Subject to any disclaimer, the term of this patent is extended or adjusted under 35 U.S.C. 154(b) by 88 days.

(21) Appl. No.: 18/259,119

(22) PCT Filed: Dec. 22, 2021

(86) PCT No.: PCT/EP2021/087361
§ 371 (c)(1),
(2) Date: Jun. 23, 2023

(87) PCT Pub. No.: WO2022/136579
PCT Pub. Date: Jun. 30, 2022

(65) Prior Publication Data
US 2024/0051810 A1 Feb. 15, 2024

(30) Foreign Application Priority Data
Dec. 23, 2020 (EP) .................................... 20217153

(51) Int. Cl.
*G05B 19/418* (2006.01)
*B67C 3/00* (2006.01)
*B67C 3/20* (2006.01)

(52) U.S. Cl.
CPC .......... *G05B 19/4185* (2013.01); *B67C 3/007* (2013.01); *B67C 3/202* (2013.01); *G05B 2219/31122* (2013.01); *G05B 2219/33001* (2013.01); *G05B 2219/36371* (2013.01); *G05B 2219/45051* (2013.01); *Y02P 90/02* (2015.11)

(58) Field of Classification Search
CPC ..... B67C 3/007; B67C 3/202; G05B 19/4185; G05B 2219/31122; G05B 2219/33001; G05B 2219/36371; G05B 2219/45051; Y02P 90/02
See application file for complete search history.

(56) References Cited

U.S. PATENT DOCUMENTS

| 10,401,842 | B2 * | 9/2019 | Spring ............... G05B 19/0426 |
| 2012/0073883 | A1 * | 3/2012 | Sobiech .................. B67C 3/202 |
| | | | 177/118 |
| 2021/0157312 | A1 * | 5/2021 | Cella .................... G01M 13/045 |
| 2022/0048750 | A1 * | 2/2022 | Winter .................... B67C 3/023 |

FOREIGN PATENT DOCUMENTS

| DE | 20 2004 007 650 U1 | 10/2005 | | |
| DE | 10 2014 106 992 A1 | 11/2015 | | |
| DE | 10 2014 111 267 A1 | 2/2016 | | |
| DE | 10 2015 209 499 A1 | 11/2016 | | |
| DE | 102016200231 A1 * | 7/2017 | ............ | G07C 3/08 |
| DE | 102018216138 A1 * | 3/2020 | ............ | B67C 3/007 |
| EP | 2 433 900 A1 | 3/2012 | | |

OTHER PUBLICATIONS

International Search Report and Written Opinion for International Application No. PCT/EP2021/087361, dated Mar. 28, 2022, 20 pages.

* cited by examiner

*Primary Examiner* — Nicolas A Arnett
(74) *Attorney, Agent, or Firm* — Seed IP Law Group LLP

(57) ABSTRACT

The present disclosure relates to a computer-implemented method for monitoring for specification conformity along a production sequence for the production of a plurality of container base bodies filled with an aqueous system with an aggregate-based production facility. Moreover, the present disclosure relates to a computer-readable storage medium which stores computer-executable commands, which, when executed by a computer device, cause the computer device to carry out a method according to the present disclosure. Finally, the present disclosure relates to quasi-continuous monitoring for specification conformity, along a production sequence for the production of a plurality of containers filled with an aqueous system, in some cases a beverage, in an aggregate-based production facility, in some cases a high-speed production facility.

28 Claims, 2 Drawing Sheets

METHOD FOR MONITORING THE PRODUCTION OF CONTAINERS FILLED WITH AN AQUEOUS SYSTEM WITH A PRODUCTION FACILITY, USE OF A MONITORING METHOD AND PRODUCTION FACILITY

BACKGROUND

Technical Field

The present disclosure relates to a method for monitoring the production of containers filled with an aqueous system for specification conformity with an aggregate-based production facility. In this respect, the present disclosure relates in some cases to the quasi-continuous monitoring for specification conformity of the production of containers filled with an aqueous system in a high-speed filling facility. The present disclosure further relates to use of a method for monitoring and to a production facility.

Description of the Related Art

Because of laboratory capacity that cannot be expanded as desired and due to the multiplicity of parameters to be taken into account, the immense production speeds of facilities and machinery and the ever more complex tests required for product quality assurance, current quality assurance systems are becoming less and less able, using conventional sampling schedules, to present data about the composition of the product, the corresponding primary and secondary packaging and any product-relevant labeling from any point in time in the process of producing a product and demonstrate said data to third parties. Even dynamized sampling schedules have their limits. A complete control is regularly not possible with the help of such sampling. This can sometimes lead to a limitation of product conformity and unnecessary scrap of material during quality control.

At the same time, consumer behavior and the individual consumer desires for product information demand improved communication between producer and consumer. The universal availability of various social media channels also means that reliable, unambiguous, coherent and in some cases rapid communication with the customer is increasingly important. Real-time availability of the underlying data is therefore desirable to successfully operate on global markets.

Thus, there is accordingly a need to provide a method with improved quality assurance for a production facility for filling containers with an aqueous system.

BRIEF SUMMARY

Accordingly, a computer-implemented method has been found for, in some cases quasi-continuous, monitoring for specification conformity along a production sequence of the production of a plurality of container base bodies, in some cases beverage containers, filled with an aqueous system, in some cases a beverage, with an aggregate-based production facility, in some cases a high-speed production facility, wherein the method comprises the steps of: receiving status information at a bridge from one or more status acquisition units, in some cases a plurality of status acquisition units, which are in each case arranged along the production sequence, these each being adapted and arranged for the acquisition, in some cases online acquisition, in some cases in intervals, of the status information, in some cases relating to the aggregates, the aqueous system, in some cases the aqueous beverage mixture, and/or the components forming the aqueous system, in some cases the aqueous beverage mixture, in the mixing apparatus, in some cases with the assistance of a network protocol and in some other cases with the assistance of an MQTT network protocol, normalizing the received status information, in some cases to a homogeneous format, on the bridge, comparing, in some cases constantly comparing, in some cases constantly comparing, the status information on the bridge with specification-compliant target range values and/or target setpoints, in some cases stored on the bridge, and providing, in some cases transmitting, a warning message, in some cases a spike message via a spike router, to a receiver unit if one item of status information or several items of status information lie(s) outside the target range values and/or target setpoints.

BRIEF DESCRIPTION OF THE SEVERAL VIEWS OF THE DRAWINGS

Further features and advantages of the present disclosure are derived from the following description, in which expedient embodiments of the present disclosure are described by way of example on the basis of schematic drawings, in which.

DETAILED DESCRIPTION

Figure 1:
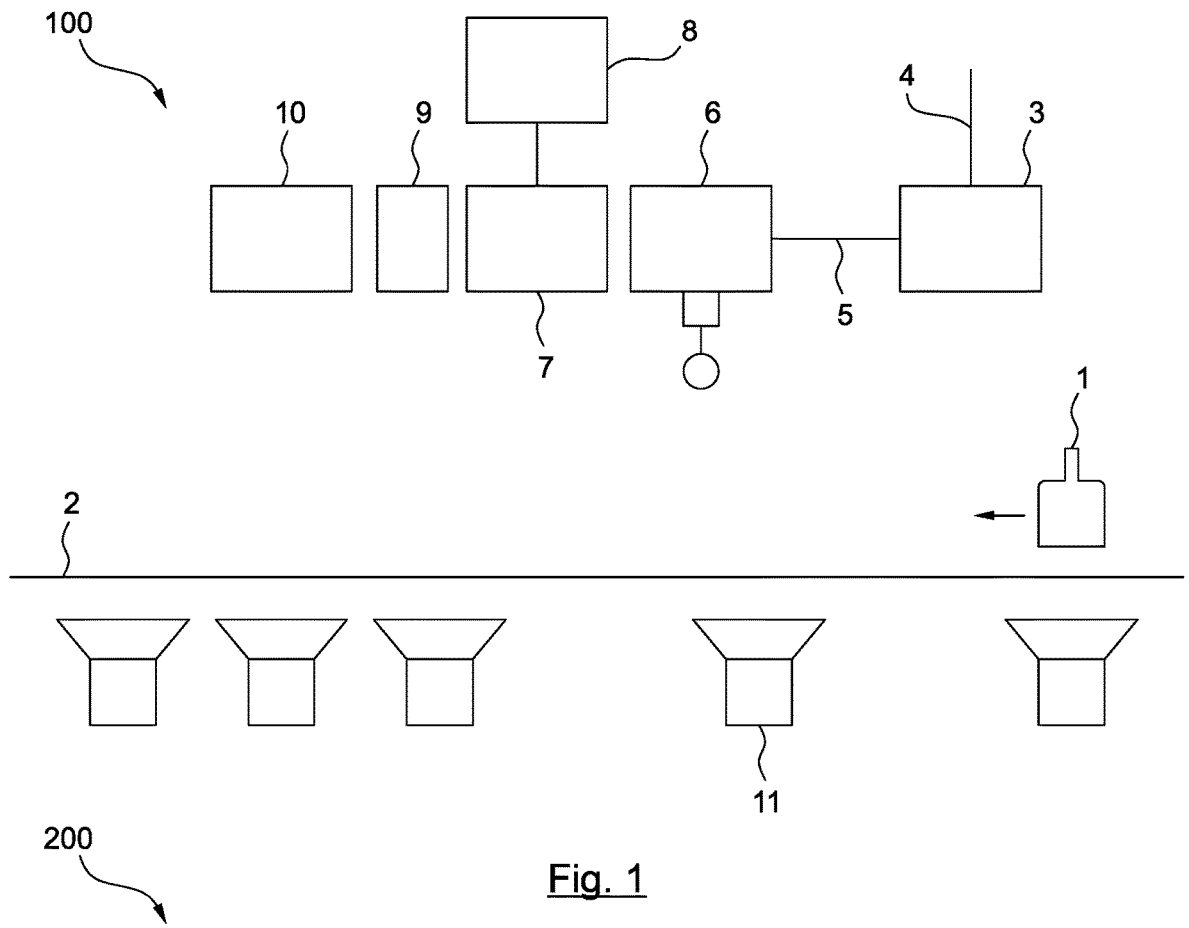
FIG. 1 shows a production facility according to one exemplary embodiment.

In an expedient embodiment, a computer-implemented method is disclosed for, in some cases quasi-continuous, monitoring for specification conformity along a production sequence of the production of a plurality of beverage containers filled with an aqueous system in the form of a beverage with an aggregate-based high-speed production facility, wherein the method comprises the steps of: receiving status information at a bridge from a plurality of status acquisition units, which are in each case arranged along the production sequence, these each being adapted and arranged for online acquisition, at intervals, of the status information relating to the aggregates, the aqueous beverage mixture, and/or the components forming the aqueous beverage mixture in the mixing apparatus, with the assistance of a network protocol and in some cases with the assistance of an MQTT network protocol, normalizing the received status information to a homogenous format on the bridge, comparing, in some cases constantly comparing, the status information on the bridge with specification-compliant target range values and/or target setpoints stored on the bridge, and transmitting, a warning message, in some cases a spike message via a spike router, to a receiver unit if one item of status information or several items of status information lie(s) outside the target range values and/or target setpoints.

The computer-implemented method according to the present disclosure enables a complete or quasi- or virtually complete, respectively end-to-end and demonstrable verifiable quality control in real time of a high-speed production facility. A facility for high-speed production of filled beverage containers, in some cases filled beverage cans, also known as a high-speed production facility, is generally understood to mean a facility which can fill over 80,000 containers, in some cases over 100,000 containers, for example 120,000 containers per hour with a liquid food product, for example a beverage.

If deviations from target values are identified, immediate measures can be taken, for example automatically or by service personnel. In this way, product conformity can be significantly improved and the scrap rate during production can be reduced. Furthermore, data about containers and the aqueous systems contained therein can be specifically and individually collected and further processed, so as to enable more in-depth analysis of qualitative production features or to share corresponding data and make them available to a wider public. For example, manufacturers and clients can retrieve and/or further process status information relating to specific batches and/or containers and the aqueous systems contained therein.

Further, qualitative features of a filled or unfilled container can be measured at a frequency which is very close to or even corresponds to continuous or quasi-continuous real-time monitoring of production and goes far beyond the checks which are possible with conventional quality assurance and quality control using facilities available hitherto. It is thus possible to greatly minimize risks. Product that are non-compliant with the specification can be more quickly and comprehensively identified in the course of production and blocked from shipment. More in depth-analyses are also possible. Products of reduced quality can be rejected prior to shipment of the specification-compliant products. These monitoring operations are possible by assigning the setpoint values batchwise to individual or multiple filled or unfilled container base bodies. In this way, it is even possible to check different products which are being produced simultaneously and sequentially in the facility against setpoint values which specify a required quality level.

According to the present disclosure, a bridge should be understood to mean a network bridge. In other words, according to an embodiment the term "bridge" can be completely replaced in the description and the claims by the term "network bridge." Such a bridge or network bridge connects networks together, wherein connected network segments each form separate collision domains. Hereby, a bridge or network bridge can generally also couple together network segments over extended sections and different transmission media. Hereby, a bridge or network bridge can constitute both a separate component and thus advantageously be used in a decentralized manner, and also be implemented in a higher-level unit, for example a server.

In an expedient embodiment, the MQTT protocol or MQTT network protocol used in the method according to the present disclosure is, in a highly expedient configuration, a layer 5-7 protocol, i.e., a protocol for layer 5 (session layer), layer 6 (presentation layer) and/or layer 7 (application layer) according to the OSI reference model (Open System Interconnection model), which is a recognized reference model for network protocols as a layered architecture. The MQTT protocol used according to the present disclosure is thus in some cases positioned on top of the layers below layer 5.

According to an expedient variant embodiment, the production facility comprises a mixing apparatus, at least one feeding line to the mixing apparatus, a filling apparatus, a transfer line for the transfer of an aqueous system, in some cases an aqueous beverage mixture, from the mixing apparatus to the filling apparatus, a closing apparatus, an apparatus adapted and arranged to deliver up the unfilled container base bodies, in some cases unfilled beverage container base bodies, in some cases unfilled beverage can base bodies, an apparatus adapted and arranged to deliver up container closures, in some cases beverage can lids, and in some cases a pasteurizing unit and/or a packaging unit, and the one or more status acquisition units, in some cases the plurality of status acquisition units.

Highly satisfactory, reliable results are obtained with such a production facility which further comprises a mixing apparatus, at least one feeding line to the mixing apparatus, a filling apparatus, a transfer line for the transfer of an aqueous beverage mixture from the mixing apparatus to the filling apparatus, a closing apparatus, an apparatus adapted and arranged to deliver up the unfilled beverage can base bodies, an apparatus adapted and arranged to deliver up beverage can lids, and a pasteurizing unit and a packaging unit, and the plurality of status acquisition units.

According to an expedient embodiment, the computer-implemented method further comprises an assignment of the warning message, in some cases using a point in time of the creation of said warning message to an in some cases closed container base body or a sequence of in some cases closed container base bodies, in some cases beverage can base bodies, filled with the aqueous system, in some cases the aqueous beverage mixture.

An advantage of this embodiment also consists in some cases in that individual or multiple container base bodies not corresponding to the setpoint values can be identified individually or in a batch/lot. It can thus be identified whether one or more particular container base bodies are associated with a warning message and quality assurance setpoint values are not complied with. This makes it possible to remove individual or multiple defective container base bodies from the production, thus reducing the number of rejected containers that do not need to be removed from production or enabling targeted responses such as servicing of the production facility, for example. The assignment can take place in some cases using a point in time of the creation of a warning message and/or by using a point in time of generation or dispatch of status information. With the point in time at which the warning message is created or an item of status information is generated and dispatched it is indicated at which point in time during the production the warning message was generated, in this way the warning message can be assigned to a particular container base body or at least a manageable number of containers or a batch/lot.

According to a further expedient embodiment, the computer-implemented method is characterized in that the high-speed production facility to be monitored fills in the range of 1 to 60, in some cases of 10 to 50 and in some other cases of 20 to 40 container base bodies, in some cases beverage can base bodies, per second with the aqueous system, in some cases the aqueous beverage mixture.

Such high-speed production facilities can yield sufficient production volumes. The processed number of container base bodies amounts to multiple container base bodies per second. This calls for (quasi)-continuous real-time monitoring of the container base bodies and places more stringent requirements on the assignment of a warning message to individual containers.

According to a further expedient embodiment, the computer-implemented method is characterized in that the status information acquired by the status acquisition units is made available at intervals which extend over a period of 1 sec to 120 sec, in some cases of 5 sec to 30 sec, to the allocated bridge, in some cases is transmitted to the allocated bridge.

Transmission of the status information to the bridge at the stated intervals of 1 to 120 sec and in some cases at an interval of 5 to 30 sec results in (quasi) continuity of acquisition of status information and, building on that, of a warning message. Thus, an advantage of this embodiment consists in enabling (quasi) continuity of the monitoring of status information for the containers and/or batches/lots. In this way, production risks are lowered and the number of rejects is reduced to a still greater extent.

According to a further expedient embodiment, the computer-implemented method is characterized in that, as soon as a warning message is created because a target range value and/or a target setpoints is not complied with, a maintenance order is generated.

An advantage of this embodiment consists in that, as a result of the maintenance order, personnel or an automated apparatus for example can be informed that a warning message exists and a target range value and/or a target setpoints for one or more container base bodies or a batch has not been complied with. This container or a sequence of the containers in a corresponding time interval can thus be removed from production either by service personnel or the automated apparatus. Furthermore, the maintenance order can indicate that an apparatus, such as for example the mixing apparatus or the like, has suffered a malfunction and a corresponding check or service of the corresponding apparatus is necessary. To this end, the maintenance order can be routed from the bridge to a duty supervisor, the plant management or a laboratory, or to another receiver device. In this way, any sources of error can be very promptly repaired.

According to a expedient preferred embodiment, the computer-implemented method is characterized in that, before- or after of the packaging unit, a clearance mode is allocated to an optionally closed container base body or a sequence of in some cases closed container base bodies, in some cases beverage can base bodies, filled with the aqueous system, in some cases the aqueous beverage mixture, if no warning message is allocated thereto.

This embodiment offers the advantage of achieving improved quality control. If no warning message is created and one or more container base bodies are explicitly cleared, it is ensured that the one or more container base bodies and the aqueous system that can be contained therein is/are within the target setpoint values (target range value and/or a target setpoint).

According to a further expedient embodiment, the computer-implemented method according to the present disclosure is characterized in that, as soon as a warning message is created because a target range value and/or a target setpoint is not complied with, the in some cases closed container base body or container base bodies, in some cases beverage container base bodies, filled with the aqueous system, in some cases the aqueous beverage mixture, and assigned to this warning message are removed from the production process during or after production.

The embodiment offers the advantage that, by removing one or more container base bodies not corresponding to the setpoint values, sufficient quality control is ensured for defective containers not to be released and not to reach the end consumer. Furthermore, the removed container base bodies can be analyzed and investigated for possible sources of error.

According to a further expedient embodiment, the computer-implemented method according to the present disclosure is characterized in that normalization of the, received status information on the bridge comprises allocation of a time stamp to one or more status information and allocation of the one or more status information to one or more status acquisition units, which have in each case generated the one or more items of status information.

This embodiment offers the advantage that status information as such is linked with a time component and the status acquisition unit(s) which has/have acquired the status information. In this way, time information may, for example, be linked with location information and an associated status acquisition information assigned to one or more filled or unfilled container base bodies. The time stamp can for example indicate when the status information was generated and/or when the status information was transmitted to the bridge and/or when the status information was received at the bridge. Status information can thus be linked individually with one or more container base bodies.

According to a further expedient embodiment, the computer-implemented method is characterized in that the time stamp reproduces that point in time at which the respective status information was dispatched to the bridge.

This embodiment has the advantage that one or more items of status information can be assigned to a point in time during production and in each case to the status information unit which has recorded a corresponding item of status information. Thus, one or more items of status information can be assigned to one or more container base bodies. This can be done under the premise that the point in time at which the one or more items of status information is dispatched corresponds substantially to the point in time at which the one or more items of status information was generated or measured.

According to a further expedient embodiment, the computer-implemented method according to the present disclosure is characterized in that, in some cases in the bridge, not only the time stamp but also information relating to the aqueous system, in some cases the aqueous beverage mixture, the used container base bodies, in some cases the beverage container base bodies, the container coding and/or packaging are assigned to the status information provided, in some cases transmitted by the status acquisition unit. In some cases, information relating to the aqueous system, in some cases the aqueous beverage mixture, the used container base bodies, in some cases beverage container base bodies, the container coding and the packaging is assigned.

This embodiment offers the advantage that container base bodies and any aqueous system located therein are uniquely identifiable with the associated status information, even within a batch, packaging and/or lot of container base bodies. This makes it possible to remove defective container base bodies in a targeted manner and/or determine sources of error or indicate deviations.

According to a further expedient embodiment, the computer-implemented method is characterized in that, the point in time at which the warning message is generated is compared with a mode in which the production facility is in.

A mode can indicate, for example, whether the production facility had been brought to a standstill or whether an error was present in one section or whether the production facility was being serviced. An advantage of this embodiment consists in the fact that a warning message can be assigned to a mode of the production facility. It thus can be identified whether a warning message is attributable to non-compliance with target setpoints or target range values or whether a mode of the production facility is responsible for the generation of a warning message.

According to a further expedient embodiment, the computer-implemented method according to the present disclosure is characterized in that, a message relating to checking the functionality of a status acquisition unit is transmitted to the receiver unit if multiple successive items of status information transmitted by this status acquisition unit are identical or if this status acquisition unit does not provide, in some cases transmit, any status information over a predetermined period of time, or if a further status acquisition unit, which is adapted and arranged to exercise the same function in parallel as the first-mentioned status acquisition unit, supplies status information which deviates therefrom, in some cases over a predetermined period, or if the status information acquired online by this status acquisition unit deviates from status information acquired offline.

This embodiment has the advantage that the functionality of individual or multiple status acquisition units can be checked. Thus, defective status acquisition units can be detected and corrected, whereby the quality control can be further improved.

According to a further expedient embodiment, the computer-implemented method according to the present disclosure is also distinguished in that, the status information received at a bridge and enriched with further information on this bridge are forwarded to a memory unit.

An advantage of this expedient embodiment lies in the fact that data can be relocated to a memory. In this way, the security of the saved data can be increased. For instance, a common security monitoring can be applied. It is furthermore possible that external users can separately access the data, such as a cloud, for example. Furthermore, collected data can be further processed, for example for statistical purposes or forecasts.

According to a further expedient embodiment, the computer-implemented method according to the present disclosure is characterized in that, the, in some cases normalized, status information forwarded to the memory unit and which is stored on the memory unit is deleted on the bridge.

An advantage of this variant lies in the fact that a data volume on the bridge does not rise above a certain value. In this way, a reduction in the computing power of the system is avoided. Furthermore, less storage capacity is consumed, whereby less costly memory components can be installed and the overall costs of the system can be reduced.

According to a further expedient embodiment, the computer-implemented method according to the present disclosure also provides that the status acquisition unit is selected from the group consisting of $CO_2$ sensors, temperature sensors, conductivity sensors, pH sensors, pressure sensors, Brix sensors, refractometers, apparatuses for determining flow rate, weighing units, filling level determination devices, in some cases filling level determination devices based on the use of gamma or X-rays, video monitoring apparatuses, in some cases equipped with image recognition and analysis software, filter apparatuses, IR spectrometers, in some cases NIR spectrometers, for example FT-NIR spectrometers, and mass spectrometers, in some cases time of flight (qTOF) mass spectrometers, for example ESI-qTOF mass spectrometers.

According to a further expedient embodiment, the computer-implemented method according to the present disclosure is characterized in that, the weighing units comprise a first weighing unit, adapted and arranged to determine the weight of one or a plurality of filled, unclosed container base bodies without any container closure, in some cases beverage container base bodies, in some cases filled beverage can base bodies, downstream of the filling apparatus, and/or a second weighing unit, adapted and arranged to determine the weight of one or a plurality of filled container base bodies, in some cases beverage container base bodies, in some other cases filled beverage can base bodies, closed with the container closure in the closing apparatus, in some cases after leaving the pasteurizing unit, and/or a third weighing unit, adapted and arranged to determine the weight of a plurality of closed, filled container b bodies, in some cases particular beverage container base bodies, downstream of the packaging unit.

This embodiment has the advantage that filled container base bodies can be weighed before and after pasteurization, in order to be able to promptly detect any leaks in the container base bodies.

According to a further expedient embodiment, the computer-implemented method according to the present disclosure is characterized in that, conductivity sensors, in some cases temperature and conductivity sensors, are present in, at and/or downstream of the mixing apparatus, and at least one feeding line to the mixing apparatus is present in, at and/or upstream of the filling apparatus and/or in and/or at the transfer line for the transfer of an aqueous system, in some cases an aqueous beverage mixture, from the mixing apparatus to the filling apparatus.

This variant embodiment has the advantage, inter alia, that the quality of the aqueous system can be checked for specification conformity using the conductivity sensors and the temperature sensors prior to filling of the aqueous system.

From the standpoint of very high-level quality assurance and quality control, such embodiments according to the present disclosure are highly expedient in which at least one status acquisition unit in the form of a video monitoring apparatus records the state of the interior of the unfilled container base body, in some cases of the unfilled beverage can base bodies, on delivery to the filling apparatus, in some cases prior to filling, and forwards it to the bridge assigned to this status acquisition unit for comparison with a specification stored therein for the appearance of the interior of the unfilled container base body, in some cases of the unfilled beverage cans base bodies. If a deviation from the setpoint is identified on the bridge, an apparatus, for example a blowing apparatus, can be automatically activated, in order to remove the unfilled container base body, in some cases the unfilled beverage can base body, which does not conform to specifications prior to filling.

Furthermore, the method according to the present disclosure has also proven highly expedient, in some cases also in the case of such embodiments, from the standpoint of very high-level quality assurance and quality control in which a status acquisition unit in the form of a pressure sensor or in the form of an apparatus to determine flow rate is used. The pressure sensors or apparatuses for determining flow rate present in the respective feeding line to the mixing apparatus, the transfer line for the transfer of the aqueous system and/or the lines for the transfer of an aqueous system for rinsing the unfilled container base bodies, in some cases the unfilled beverage can base bodies, contribute significantly to the high-speed production facility being continuously operable over a very long period. Hereby, the detected pressures and/or flow rates are compared with specifications stored on the bridge assigned to the respective status acquisition unit.

By using pressure sensors or apparatuses for determining flow rate in the lines for the transfer of an aqueous system for rinsing the unfilled container base bodies, in some cases the unfilled beverage can base bodies, it is highly reliably possible to ensure that only containers which conform to specifications are filled in the filling apparatus.

Furthermore, the method according to the present disclosure has also proven highly expedient, in some cases also in the case of such embodiments, from the standpoint of very high-level quality assurance and quality control in which at least one status acquisition unit in the form of a temperature sensor, in some cases a plurality of such temperature sensors, is used in the pasteurizing unit. Through constant, in some cases continuous or quasi-continuous monitoring of the temperature along the pasteurizing unit, a very high quality level can be ensured in the production of aqueous food products, beverages, which conform to specifications. If it is identified, by way of the comparison on the bridge, that target temperature values cannot be complied with, the container batch in question, limited to the containers actually affected, are removed from the production process and blocked from sale. In this way, the reject quantity is kept as low as possible.

According to a further expedient embodiment, the computer-implemented method is characterized in that, the status data acquired on the production line for a container base body, in some cases beverage container base body, or for a sequence of container base bodies, in some cases beverage container base bodies, and/or for the aqueous system, in some cases the aqueous beverage mixture, of a container base body, in some cases beverage container base body, or a sequence of container base bodies, in some cases beverage container base bodies, are assigned to the coding applied with a coding unit to the container base bodies, in some cases beverage container base bodies, and/or the associated container closure.

An advantage of this embodiment lies in the fact that status information, which has been acquired for each batch, packaging, lot, aqueous system and/or each container base body, can be retrievably assigned by a third party. In this way, this information can be attached retrievably to a packaging of one or more container base bodies or one container base body itself, for example in a QR code or a similar read-out mechanism. In this way, it is possible for purchasers to check the status information and thus check a measure of the quality of an aqueous system within a container base body.

According to a further expedient embodiment, the computer-implemented method is characterized in that, status information, in some cases relating to the aggregates and/or the components forming the aqueous system, in some cases the aqueous beverage mixture, in the mixing apparatus, which have been acquired via units other than the plurality of status acquisition units arranged in each case along the production sequence, is assigned, in some cases on the bridge, to the status information acquired and detected with the plurality of status acquisition units for an aqueous system, in some cases an aqueous beverage mixture, and/or the container base bodies filled therewith, in some cases beverage container base bodies.

An advantage of this embodiment lies in the fact that status information can be assigned to an aqueous system which has been filled into one or multiple container bodies, and thus a quality of an aqueous system within a container body can be determined and indicated. In this way, corresponding steps can be introduced in response to a quality check, such as for example recall of containers.

According to a further expedient embodiment, the computer-implemented method according to the present disclosure is also characterized in that, at least one, in some cases a plurality of status acquisition units, which are arranged in each case along the production sequence, is adapted and arranged to make available up to 200 items of status information per second to the associated bridge, in some cases transmit them to the associated bridge.

An advantage of this embodiment lies in the fact that it has been identified that the provision of up to 200 items of status information per second enables (quasi)-continuous monitoring and thus an improved high-speed production facility is obtained.

According to a further expedient embodiment, the computer-implemented method according to the present disclosure is characterized in that, the bridge is arranged and adapted to compare the obtained status information with the target range values and/or target setpoints at successive intervals of 5 to 60 seconds and in some cases provide a warning message to the receiver unit or make available a warning message.

An advantage of this expedient embodiment lies in the fact that (quasi)-continuous monitoring is enabled by comparison at successive 5 to 60 second intervals. In this way, defective container base bodies and aqueous systems contained therein can be determined in such a way within a high-speed production facility that numbers of rejects when defective containers are removed which do not meet the corresponding setpoint values are reduced to manageable levels.

According to a further expedient embodiment, the computer-implemented method is characterized in that, the bridge is arranged and adapted to supplement the warning message generated, in some cases generated in relation to a deviation of status information from the target range values and/or target setpoints with instructions for action for the receiver unit.

An instruction for action can include instructions that provide an authorized person with instructions to respond to a warning message. For example, these instructions can comprise directions for responding and re-establishing setpoint values or servicing the facility in question. Thus, this expedient embodiment offers the advantage that authorized personnel can respond appropriately to a warning notice.

The present disclosure likewise provides a computer program with computer program elements, which are in operation in a data processing apparatus for implementing the method according to the present disclosure, in some cases in accordance with one of the above embodiments.

The present disclosure likewise provides a computer-readable storage medium, which stores computer-executable commands which, when executed by a computer device, cause the computer device to carry out the method according to the present disclosure, in some cases in accordance with one of the above embodiments.

According to a further expedient embodiment, the present disclosure likewise provides for use of the method according to the present disclosure, in some cases in accordance with one of the above embodiments, or the computer program or the computer-readable storage medium for quasi-continuous monitoring for specification conformity, along the production line for the production of a plurality of containers filled with an aqueous system, in some cases a beverage, in some cases beverage containers, in a unit-based production facility, in some cases a high-speed production facility.

According to a further expedient embodiment, the use of the computer-implemented method according to the present disclosure is also characterized in that, at least two, in some cases at least three, different aqueous systems, in some cases aqueous beverage mixtures, are simultaneously processed on separate sections of the production facility, in some cases high-speed production facility. Accordingly, with a facility according to the present disclosure operated with the computer-implemented method according to the present disclosure, different products can be produced simultaneously, i.e., over the same period of time in spatial sequence, i.e., on separate sections or sequences of the facility, and thus sequentially at the same time.

According to a further expedient embodiment, the use of the computer-implemented method according to the present disclosure or of the computer program or of the computer-readable medium for, in some cases automated, clearance and/or blockage of a closed beverage can base body filled with an aqueous system, in some cases an aqueous beverage mixture, or a sequence of such beverage can base bodies, on a production facility, in some cases a high-speed production facility.

According to a further expedient embodiment, the use of the computer-implemented method according to the present disclosure or of the computer program or of the computer-readable medium to monitor the functionality of a status acquisition unit to monitor the functionality of a status acquisition unit, is provided.

The present disclosure likewise provides a production facility comprising one or more processors which are adapted and arranged to carry out the above-described method and the associated embodiments, the one or more status acquisition units, the bridge in communicative connection with the one or more status acquisition units, and the receiver unit in communicative connection with the bridge.

The present disclosure likewise provides a bridge, in some cases a network bridge, comprising one or more processors, which are adapted and arranged to carry out individually or collectively the above-described method and the associated embodiments. Hereby, the bridge according to the present disclosure is in some cases provided with an MQTT network protocol.

In the figures, elements which are the same or have the same or similar function are provided with the same reference numbers.

FIG. 1 shows a schematic structure of a production facility, in some cases a filling facility or a high-speed filling facility. The production facility has a production sequence 2 such as for example a conveyor belt, which conveys unfilled container base bodies 1 along different sections of the production facility 100. The production facility 100 is configured to carry out different production processes in separate sections, such that at one end of the production unit a container base body 1 is output, either unpackaged or packaged individually or together with a plurality of other container base bodies 1.

The production facility 100 can have a mixing apparatus 3 with at least one feeding line 4. One or more liquid or solid components can be supplied to the mixing apparatus 3 via the at least one feeding line 4. Within the mixing apparatus 3, the one or more liquid or solid components are mixed together to yield an aqueous system, in some cases a beverage.

The mixing apparatus 3 is connected for fluid flow via a transfer line 5 to a filling apparatus 6, to convey the aqueous system from the mixing apparatus 3 to the filling apparatus 6. The filling apparatus 6 is adapted and arranged to output the aqueous system in a predetermined quantity into the unfilled container base bodies 1, such that the unfilled container base bodies 1 are filled with the aqueous system up to a certain level with the aqueous system.

Furthermore, the production facility 100 can comprise a closing apparatus 7, which is adapted and arranged to close container base bodies 1 filled with an aqueous system using closures. To this end, the closing apparatus 7 can moreover comprise an apparatus 8 for delivering up closures, which is connected to the closing apparatus 7.

The production facility 100 can further comprise a pasteurizing apparatus 9. The pasteurizing apparatus 9 is adapted and arranged to heat the containers filled with an aqueous system, for example at 60° C. or more.

The production facility can moreover have a packaging apparatus 10, which is adapted and arranged to package individual or multiple container base bodies 1 filled with an aqueous system. The packaging of one or more filled container base bodies 1 or a container base body itself can in this case be provided with a readable, in some cases machine-readable, code, in which information (such as for example status information) about a container base body 1, an aqueous system contained therein and/or a production process are encoded. One example of such a code can be a QR code or an NCF-readable chip or the like.

The production facility may be subdivided into different sections, in which different production steps are carried out. For example, a production process or production step, such as for example the above-stated filling or mixing of an aqueous system, can be carried out in one section.

The production facility can have one or more status acquisition units 11. The status acquisition units 11 can be arranged along the production sequence 2. Furthermore, individual status acquisition units 11 can be assigned to the different sections or different production processes. For example, one or more status acquisition units 11 can be assigned to the filling apparatus 6 or to the production step of filling. A status acquisition unit 11 can be a sensor which is arranged and adapted to acquire a feature of a filled or unfilled container base body 1 and an aqueous system as such or within a container base body 1 and/or external factors of the surrounding environment, such as for example pressure, temperature, atmospheric humidity and/or a point in time.

The status acquisition units 11 can be adapted and arranged to provide one or more items of status information, in some cases to transmit them to the bridge.

A status acquisition unit 11 can be selected from a group consisting of $CO_2$ sensors (for example for determining a $CO_2$ content), temperature sensors (for example for determining an ambient temperature, for determining a temperature of the aqueous system, for example within the mixing apparatus 3, within or during filling, or within a container base body 1), conductivity sensors (for example for determining a conductivity, for example of the aqueous system), pH sensors (for example for determining a pH of the aqueous system), pressure sensors (for example for determining an ambient pressure or a pressure within lines or apparatus of the production facility or a filling pressure), Brix sensors, refractometers (for example for determining a refractive index of the aqueous system within a container base body or outside a container base body), apparatuses for determining flow rate (for example for determining a flow rate in some cases of the aqueous system through lines of the production facility, weighing units such as a balance, for example for measuring and comparing the weight of one or more base bodies in the filled or unfilled state), filling level determination devices, in some cases filling level determination devices based on the use of gamma or X-rays (for example for determining a filling level of the aqueous system within the container base bodies 1, for example by "transilluminating" the container base bodies 1 using gamma or X-rays), video monitoring apparatuses, in some cases equipped with image recognition and analysis software, filter apparatuses, IR spectrometers, in some cases NIR spectrometers such as FT-NIR spectrometers, and mass spectrometers, in some cases time of flight (qTOF) mass spectrometers and/or FT-NIR spectrometers, in some cases FT-NIR spectrometers.

The one or more status acquisition units 11 can be adapted and arranged to measure a status or status information for example every 10 seconds and to transmit the status information to the bridge 12.

Figure 2:
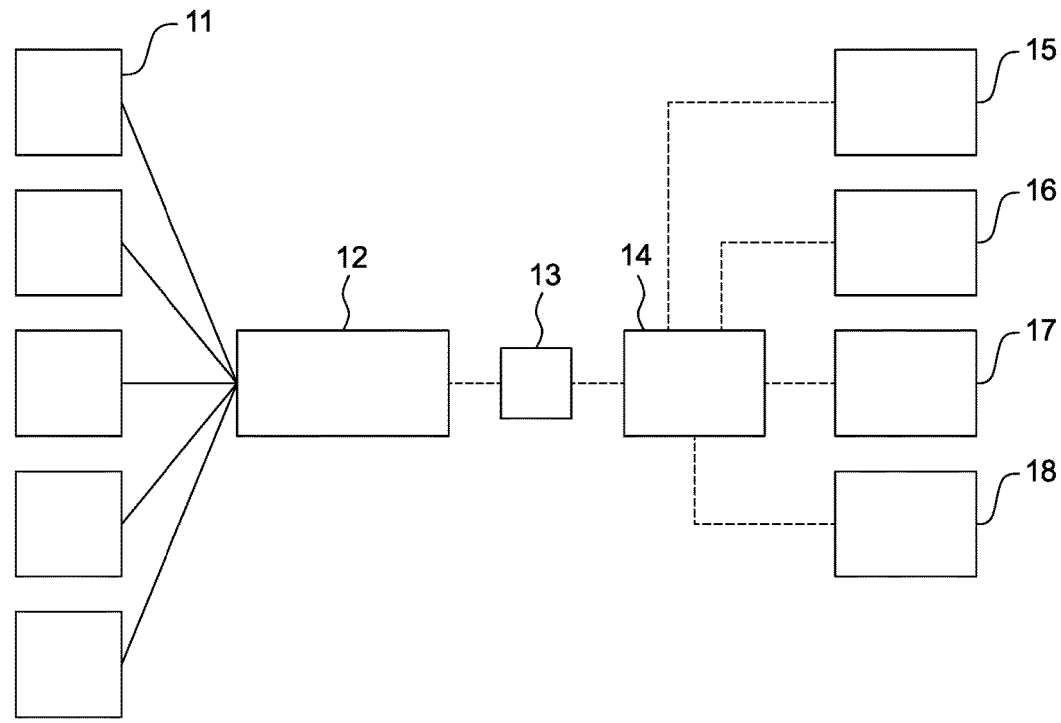
FIG. 2 is a schematic and exemplary representation of a connection of network components of a production facility.

FIG. 2 shows a schematic and exemplary representation of a connection of network components of a production facility.

One or more status acquisition units 11 can be in communicative connection with a bridge 12, in order to transmit data such as for example information acquired by the status acquisition units 11 to the bridge 12.

The transmission of the status information from the status acquisition units 11 to the bridge 12 can take place in various ways, for example using the MQTT (Message Queuing Telemetry Transport) network protocol, also known as MQTT network protocol. In this case, the bridge 12 can for example be an MQTT broker, which receives information from one or more external clients. A further type of transmission can take place via API (application programming interface) (Rest call). Herewith, sensor values can be transmitted to the bridge 12 via an https post call interface and integration provided for other systems. The transmission of status information can for example proceed in real-time or at comparatively short time intervals such as at intervals of 10 seconds for example.

One or more items of status information can be enriched on the bridge 12. For example, a time stamp of one or more sending status acquisition units can be associated with status information from one or more further status acquisition units 11. Building on this, one or more items of status information can be associated with a filled or unfilled container base body 1 or a batch or a packaging with one or more filled or unfilled container base bodies 1. For example, a measured value from one sensor or measured values from a plurality of sensors can be provided with a time stamp of the measuring sensor, which time stamp indicates, for example, the point in time at which an item of information was measured or the point in time at which an item of information was dispatched or the point in time of receipt at the bridge, as well as associated with a batch.

The bridge 12 can furthermore be arranged and adapted to compare status information from one or more status acquisition units 11 with predetermined, specifications, target range values and/or target setpoint. The target range values and the target setpoints can for example indicate certain qualitative requirements (such as for example filling levels). The target range values and the target setpoints can for example be stored in an internal memory on the bridge 12. Furthermore, the target range values and the target setpoints can be received from an external entity. The bridge 12 can have one or more processors which are arranged to carry out the monitoring method alone or collectively. Furthermore, the bridge 12 can likewise have a memory for storing target range values or target setpoint values or to store status information.

Furthermore, the bridge 12 can be arranged and adapted to generate a warning message if status information in some cases relating to a filled or unfilled container base body 1 or the aqueous system does not fall within a target range value and/or if a target setpoint is not met. Moreover, the bridge 12 can be arranged and adapted to generate a confirmation message if an item of status information in some cases relating to a filled or unfilled container base body 1 or the aqueous system as such falls within a target range value and/or if a target setpoint is met.

Moreover, the bridge 12 can be arranged and adapted to assign the warning message or the confirmation message for example by means of the enriched, in some cases the associated, status information to one or more filled or unfilled container base bodies. Furthermore, the confirmation message and/or the warning message can be assigned to a batch/lot of filled or unfilled base bodies. The one or more items of status information can be assigned to one or more container base bodies 1 for example by way of the point in time at which one or more items of status information was/were acquired (or dispatched). In this way, one or more items of status information, which were generated or dispatched at a given point in time by one or more given status acquisition units 11, can be assigned to one or more filled or unfilled container base bodies 1.

The bridge 12 can be in communication with a receiver unit 14. In one possible variant, the bridge 12 can be in communication with the receiver unit 14 via a spike router 13.

The bridge 12 can be adapted and arranged to transmit the status information as such, the enriched (normalized) status information and/or the warning message or in some cases the confirmation message to the receiver unit 14. The bridge 12 can for example transmit a spike message to the receiver unit 14 via a spike router 13. The normalized items of status information correspond to enriched status information or associated status information.

One example of a receiver unit 14 can for example be a terminal 18 which informs authorized individuals about the warning message or the confirmation message, for example in the form of a signal via a screen, a light and/or a loudspeaker. The personnel can then in some cases carry out the necessary steps in response to the warning message or the confirmation message. Defective base bodies or defective batches can, for example, be rejected or the facility serviced at the defective areas. Furthermore, corresponding status information can be displayed simultaneously with a warning message or a confirmation message.

A further example of a receiver unit 14 can be an apparatus which is arranged and adapted to remove automatically filled or unfilled container base bodies from production (removal apparatus 16). In this way, containers or aqueous systems which do not correspond to target range values and or target setpoint values can be removed from production in an automated manner.

Furthermore, an example of a receiver unit 14 can be a database 16. Status information as such or enriched status information can for example be transmitted alone and or in combination with a warning message or confirmation message to the database from the bridge. In the course thereof, corresponding information from the sensors can be deleted on the bridge when the corresponding data are stored to the database.

A further example of a receiver unit 14 can be the packaging apparatus 10 or a separate encoding apparatus 17. The packaging apparatus 10 or the encoding apparatus 17 can for example be adapted and arranged to apply status information as such, the enriched status information and/or a warning message/a confirmation message in the form of coding, for example a QR code, on the packaging of one or more container base bodies or to the container base bodies themselves.

Figure 3:
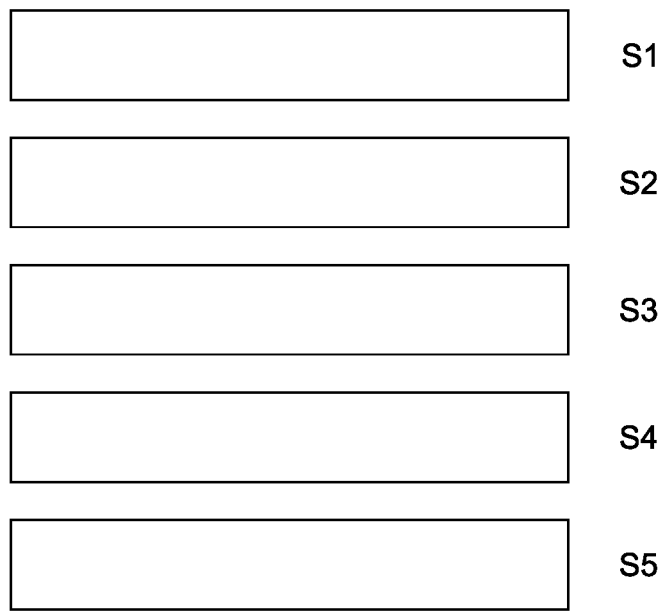
FIG. 3 shows a computer-implemented method according to one embodiment.

FIG. 3 shows by way of example a computer-implemented method according to one embodiment.

In a step S1, status information about a filled or unfilled container can be acquired by one or more status acquisition units. The status information can be acquired in real-time or at comparatively short intervals of for example 10 seconds. The status information can likewise be provided with time information.

In a step S2, status information can be forwarded from one or more status acquisition units 11 to a bridge 12, for example with the assistance of an MQTT network protocol. In a further variant, status information can be forwarded directly via the bridge 12 to an external receiver unit 14.

In a step S3, the transmitted status information can be normalized, i.e., enriched, on the bridge 12. Status information can for example be provided with a time stamp and associated with further status information.

In a step S4, the transmitted status information can be compared by the bridge at given intervals of time or constantly to identify whether the status information falls within predetermined target range values or complies with predetermined target setpoints.

In a further step S5, a warning message based on the comparison according to step S4 can be produced, which indicates that a given target range value and/or a target setpoint has not been complied with. Furthermore, on the basis of the comparison according to step S4, confirmation can be subsequently produced which indicates that a given target range value and/or a given target setpoint has been complied with.

In a step S6, the warning message and/or the confirmation message can be forwarded to a receiver unit 14 for example via a spike router 13 using a spike message, if an item of status information or multiple items of status information fall(s) outside or within the target range values and/or the target setpoints.

The features of the present disclosure disclosed in the above description and in the claims can be essential either individually or in any desired combination for carrying out the various embodiments of the present disclosure.

REFERENCE NUMERALS

1—Container base body
2—Production line
3—Mixing apparatus
4—Feeding line to mixing apparatus
5—Transfer line
6—Filling apparatus
7—Closing apparatus
8—Apparatus for delivering up closures
9—Pasteurizing apparatus
10—Packaging apparatus
11—Status acquisition unit
12—Network bridge
13—Spike router
14—Receiver unit
15—Database
16—Removal apparatus
17—Coding apparatus
18—Terminal
100—Production facility
200—Association of network components The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A computer-implemented method for quasi-continuous monitoring for specification conformity along a production sequence of a production of a plurality of container base bodies filled with an aqueous system with an aggregate-based high-speed production facility, wherein the method comprises:
   receiving status information at a network bridge from a plurality of status acquisition units which are in each case arranged along the production sequence, the plurality of status acquisition units each being adapted and arranged for online acquisition in intervals of the status information;
   normalizing the received status information on the network bridge;
   comparing the status information on the network bridge with specification-compliant target range values and/or target setpoints stored on the network bridge; and
   providing a warning message to a receiver unit if an item of status information or number of items of status information lie(s) outside the target range values and/or target setpoints,
   wherein the high-speed production facility to be monitored fills in a range of 10 to 50 container base bodies per second with the aqueous system, and
   wherein, in the network bridge, not only a time stamp but also further information relating to the aqueous system, the container base bodies used, the container coding and/or packaging are assigned to the status information provided by the plurality of status acquisition units.

2. The method according to claim 1, wherein the production facility comprises:
   a mixing apparatus;
   at least one inflow line to the mixing apparatus;
   a filling apparatus;
   a transfer line for the transfer of an aqueous system from the mixing apparatus to the filling apparatus;
   a closing apparatus;
   an apparatus adapted and arranged to deliver up unfilled container base bodies;
   an apparatus adapted and arranged to deliver up container closures; and
   the plurality of status acquisition units.

3. The method according to claim 1, further comprising:
   assigning the warning message to a container base body or a sequence of container base bodies filled with the aqueous system.

4. The method according to claim 3, wherein, as soon as the warning message is created because a target range value and/or a target setpoint is not complied with, the container base body or container base bodies filled with the aqueous system and assigned the warning message are removed from a production process during or after production.

5. The method according to claim 3, wherein the container base body or the sequence of container base bodies are closed.

6. The method according to claim 1, wherein the status information acquired by the plurality of status acquisition units is made available to the network bridge in intervals which extend over a period of 1 sec to 120 sec.

7. The method according to claim 1, further comprising generating a maintenance order as soon as the warning message is created because a target range value and/or a target setpoint is not complied with.

8. The method according to claim 1, further comprising, before or after a packaging unit, allocating a clearance mode to a container base body or a sequence of container base bodies filled with the aqueous system if no warning message is allocated thereto.

9. The method according to claim 1, wherein normalizing the received status information on the network bridge comprises:
allocating a time stamp to one or more items of status information; and
allocating the one or more items of status information to one or more status acquisition units, which have in each case generated the one or more items of status information.

10. The method according to claim 9, wherein the time stamp reproduces a point in time at which the respective status information was received by the network bridge.

11. The method according to claim 1, further comprising comparing a point in time at which the warning message is provided with a mode in which the production facility is operating.

12. The method according to claim 1, further comprising transmitting a message relating to checking a functionality of a status acquisition unit in the plurality of status acquisition units to the receiver unit if multiple successive items of status information transmitted by the status acquisition unit are identical or if the status acquisition unit does not provide any status information over a predetermined period of time, or if a further status acquisition unit, which is adapted and arranged to exercise the same functionality in parallel as the first-mentioned status acquisition unit, supplies status information which deviates therefrom or if the status information acquired online by the status acquisition unit deviates from status information acquired offline.

13. The method according to claim 1, wherein the status information received by the network bridge and status information augmented with the further information on the network bridge are forwarded to a memory unit.

14. The method according to claim 13, further comprising deleting on the network bridge the status information forwarded to the memory unit and which is stored on the memory unit.

15. The method according to claim 1, further comprising selecting a status acquisition unit from a group consisting of CO2 sensors, temperature sensors, conductivity sensors, pH sensors, pressure sensors, Brix sensors, refractometers, apparatuses for determining flow rate, weighing units, filling level determination devices, video monitoring apparatuses, filter apparatuses, IR spectrometers, and mass spectrometers.

16. The method according to claim 15, wherein the weighing units comprise a first weighing unit, adapted and arranged to determine a weight of one or a plurality of filled, unclosed container base bodies without any container closure downstream of a filling apparatus, and/or a second weighing unit, adapted and arranged to determine a weight of one or a plurality of filled container base bodies closed with a container closure in a closing apparatus, and/or a third weighing unit, adapted and arranged to determine a weight of a plurality of closed, filled container base bodies downstream of a packaging unit.

17. The method according to claim 15, further comprising:
arranging conductivity sensors in, at, and/or downstream of a mixing apparatus; and
arranging at least one feeding line to the mixing apparatus at and/or upstream of a filling apparatus and/or in and/or at a transfer line for transfer of an aqueous system from the mixing apparatus to the filling apparatus.

18. The method according to claim 1, wherein the status information acquired on a production line for a container base body or for a sequence of container base bodies and/or for the aqueous system of a container base body or a sequence of container base bodies are assigned to a coding applied with a coding unit to the container base bodies and/or an associated container closure.

19. The method according to claim 1, further comprising assigning, on the network bridge, status information which has been acquired via units other than the plurality of status acquisition units arranged in each case along the production sequence, to the status information acquired and detected with the plurality of status acquisition units for the aqueous system and/or the container base bodies filled therewith.

20. The method according to claim 1, wherein the plurality of status acquisition units, which are arranged in each case along the production sequence, are adapted and arranged to make available up to 200 items of status information per second to the network bridge.

21. The method according to claim 1, wherein comparing the status information on the network bridge with specification-compliant target range values and/or target set points comprises comparing the status information with the target range values and/or target setpoints at successive intervals of 5 to 60 seconds.

22. The method according to claim 1, further comprising supplementing the warning message provided to the receiver unit with instructions for action for the receiver unit.

23. The method according to claim 1, wherein receiving the status information at the network bridge takes place by the plurality of status acquisition units with assistance of a network protocol.

24. A non-transitory computer-readable storage medium, which stores computer-executable commands which, when executed by one or more processors, cause a network bridge of a production facility to implement the method according to claim 1.

25. A production facility, comprising:
a network bridge comprising one or more processors, which are adapted and arranged to carry out individually or collectively the method according to claim 1;
a plurality of status acquisition units in communication with the network bridge; and
a receiver unit in communication with the network bridge.

26. The method according to claim 1, wherein providing the warning message to the receiver unit comprises making the warning message available to the receiver unit.

27. The method according to claim 1, wherein the high-speed production facility to be monitored fills in a range of 20 to 40 container base bodies per second with the aqueous system.

28. The method according to claim 1, wherein the container base bodies are beverage can base bodies.

* * * * *